A. MORGAN.
SPRING WHEEL.
APPLICATION FILED MAR. 15, 1915.
1,156,306.
Patented Oct. 12, 1915.
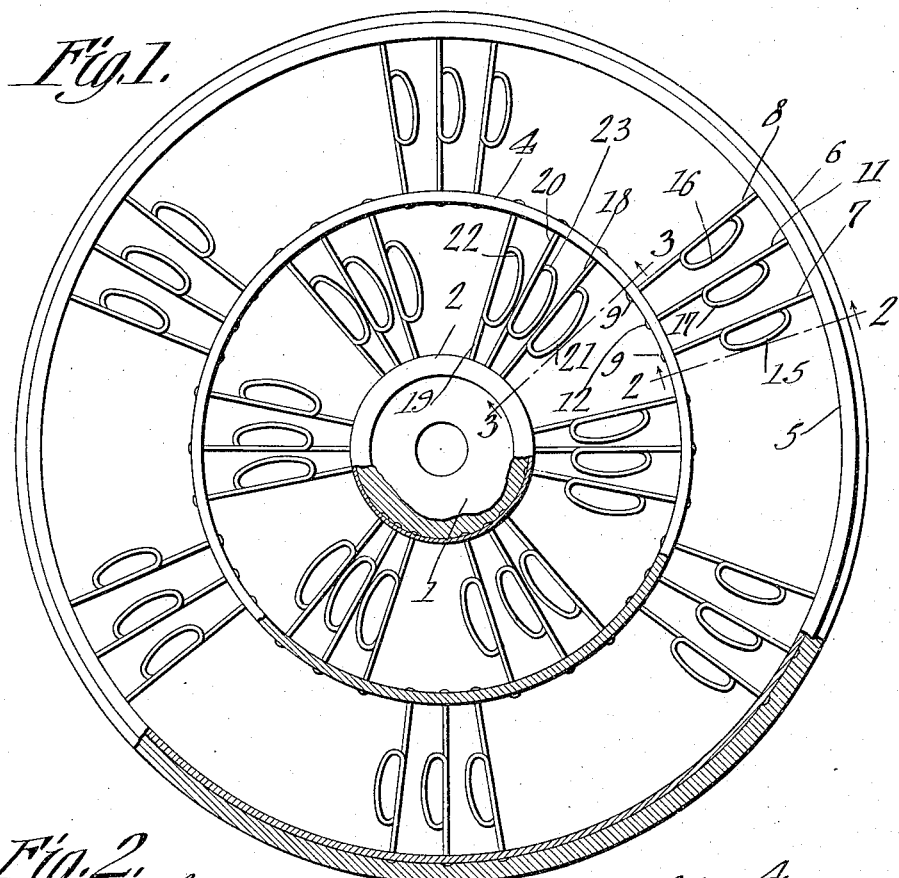
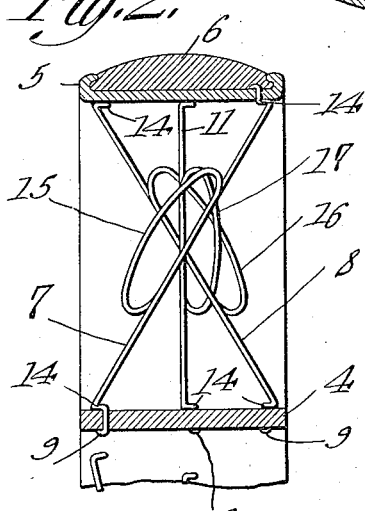
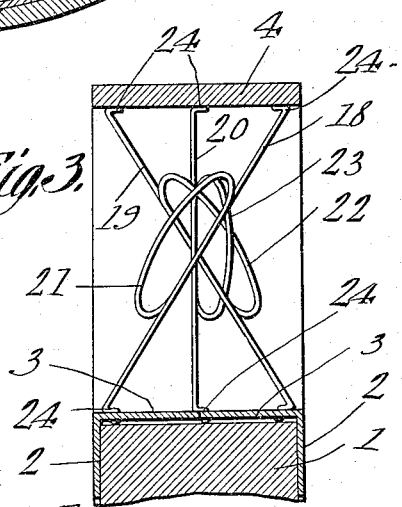
Witnesses
A. Morgan  Inventor
by  Attorneys

UNITED STATES PATENT OFFICE.

ABRAHAM MORGAN, OF INDEPENDENCE, MISSOURI.

SPRING-WHEEL.

1,156,306.

Specification of Letters Patent.

Patented Oct. 12, 1915.

Application filed March 15, 1915. Serial No. 14,454.

*To all whom it may concern:*

Be it known that I, ABRAHAM MORGAN, a citizen of the United States, residing at Independence, in the county of Jackson and State of Missouri, have invented a new and useful Spring-Wheel, of which the following is a specification.

The device forming the subject matter of this application is a spring wheel and one object of the present invention is to provide a means whereby the hub of the wheel will be, in effect, suspended from the top of the wheel, thereby insuring great resiliency.

Another object of the invention is to improve the form of the spring spokes.

A further object of the invention is to provide novel means for assembling the spokes with the various circumferential parts of the wheel.

It is within the scope of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—Figure 1 shows the invention in side elevation, parts being broken away; Fig. 2 is a cross section on the line 2—2 of Fig. 1; Fig. 3 is a cross section on the line 3—3 of Fig. 1.

The wheel herein disclosed comprises a hub 1. Secured onto the ends of the hub 1 are angle plates 2 which are of annular form, the transverse flanges 3 of the plates 2 meeting, or being in close contact adjacent the median plane of the hub 1.

Spaced from the hub 1 is an inner rim 4 and spaced from the inner rim 4 is an outer rim 5. The outer rim 5 may carry a tire 6. The tire 6 may be of any desired construction and since I am aware of the fact that a tire cannot be claimed in the same application with a spring wheel, and since I do not desire to be limited to any specific form of tire, no details as to the construction of the tire 6 are or need be given.

The outer rim 5 is connected with the inner rim 4 by means of crossed spokes 7 and 8, as shown in Fig. 2. The inner ends 9 of the spokes 7 and 8 are secured in any desired manner to the inner rim 4, the outer ends of the spokes 7 and 8 being secured to the outer rim 5. Located parallel to the median plane of the wheel and disposed between the spokes 7 and 8 is a spoke 11, the ends 12 of which are connected respectively to the inner rim 4 and the outer rim 5. All of the spokes 7, 8 and 11 are bent laterally near their ends, to form shoulders 14 which coact, respectively with the outer rim 5 and with the inner rim 4. The spokes 7, 8 and 11 preferably are disposed in groups of three, as shown in Fig. 1, and these groups are spaced circumferentially of the wheel. More than three springs, however, may be employed in each group if desired.

The spoke 7 is bent and crossed upon itself to form a loop 15, the spoke 8 is bent and crossed upon itself to form a loop 16, and the spoke 11 is bent and crossed upon itself to form a loop 17. All of these loops 15, 16 and 17 extend longitudinally of the spokes of which they constitute a part. The loops 15 and 16 of the spokes 7 and 8 respectively, project in opposite directions with respect to the median plane of the wheel, as shown in Fig. 2. The loop 17 of the spoke 11 projects in the same general direction as the loop 16 of the spring 8. All of the loops 15, 16 and 17 lie in planes which are disposed at an acute angle, and preferably at an angle of about 45 degrees, with respect to the median plane of the wheel, as will be understood when Figs. 1 and 2 are examined.

The inner rim 4 is connected with the hub plates 2 by means of crossed springs 18 and 19. A spoke 20 which is located parallel to the median plane of the wheel connects the inner rim 4 with one of the hub plates 3. The spokes 18 are provided with loops 21, the spokes 19 are provided with loops 22 and the spokes 20 are provided with loops 23. The last specified spokes and their loops maintain the same relations with respect to each other as do the spokes previously described and shown in Fig. 2, the shoulder portions of the spokes appearing at 24.

The spokes 18, 19 and 20 preferably are disposed in groups of three, and these groups alternate, circumferentially of the wheel, with the groups of spokes 7, 8 and 11.

The specific arrangement of spring loops hereinbefore described gives unusual resiliency to the wheel, combining with such resiliency, a maximum efficiency to withstand unusual or abnormal strains.

The construction of the device is such that the weight of the car or vehicle, carried by the hub, will be suspended from the outer rim of the wheel and be delicately hung therefrom, thereby permitting great resiliency, combined, as hereinbefore stated, with a maximum efficiency in resisting abnormal strains. All of the loops of course are resilient.

Having thus described the invention, what is claimed is:—

1. A spring wheel embodying spaced parts; and a spring spoke connecting said parts, the intermediate portion of the spoke being bent and crossed upon itself to form a loop extended longitudinally of the spoke.

2. A spring wheel embodying spaced parts; and a spring spoke connecting said parts, the intermediate portion of the spoke being bent and crossed upon itself to form a loop extended longitudinally of the spoke, the loop lying in a plane which defines an acute angle with the median plane of the wheel.

3. A spring wheel embodying spaced parts; and crossed spring spokes connecting said parts, the intermediate portions of the spokes being bent and crossed upon themselves to form loops extended longitudinally of the spokes, the loops projecting in opposite directions with respect to the median plane of the wheel.

4. A spring wheel embodying spaced parts; and crossed spring spokes connecting said parts, the intermediate portions of the spokes being bent and crossed upon themselves to form loops extended longitudinally of the respective spokes, the loops projecting in opposite directions with respect to the median plane of the wheel, the loops being disposed at an angle to the median plane of the wheel.

5. A spring wheel embodying spaced parts; crossed spring spokes connecting said parts; a third spoke connecting said parts and located between the crossed spokes, the third spoke being disposed approximately parallel to the median plane of the wheel, all of the spokes being bent and crossed upon themselves to form loops which extend longitudinally of the respective spokes.

6. A spring wheel embodying spaced parts; crossed spring spokes connecting said parts; a third spoke connecting said parts and located between the crossed spokes; all of the spokes being bent and crossed upon themselves to form loops which extend longitudinally of the respective spokes, the loops of the crossed spokes extending in opposite directions with respect to the median plane of the wheel, and all of the loops being disposed at an acute angle to the median plane of the wheel.

In testimony that I claim the foregoing as my own, I have hereto affixed my signature in the presence of two witnesses.

ABRAHAM MORGAN.

Witnesses:
I. A. SMITH,
JAY M. GOULD.

Copies of this patent may be obtained for five cents each, by addressing the "Commissioner of Patents, Washington, D. C."